United States Patent
Maruyama et al.

[11] Patent Number: 5,906,184
[45] Date of Patent: May 25, 1999

[54] FAULT DECIDING SYSTEM FOR IDLE REVOLUTION CONTROLLING UNIT

[75] Inventors: Hiroshi Maruyama; Shigeto Kashiwabara; Yuzuru Koike, all of Wako, Japan

[73] Assignee: Honda Giken Kogyo Kabushiki Kaisha, Tokyo, Japan

[21] Appl. No.: 08/943,619

[22] Filed: Oct. 3, 1997

[30] Foreign Application Priority Data

Oct. 7, 1996 [JP] Japan ................................. 8-266400

[51] Int. Cl.$^6$ ............................ F02D 41/16; G01M 15/00
[52] U.S. Cl. ................................. 123/339.15; 73/117.3; 73/118.1
[58] Field of Search ........................... 123/339.15, 396, 123/399, 479; 73/116, 117.3, 118.1; 701/114

[56] References Cited

U.S. PATENT DOCUMENTS

| | | | |
|---|---|---|---|
| 5,056,483 | 10/1991 | Ohuchi | 123/339.15 |
| 5,511,412 | 4/1996 | Campbell, III et al. | 73/117.3 |
| 5,614,666 | 3/1997 | Hara et al. | 123/339.15 X |

*Primary Examiner*—Tony M. Argenbright
*Attorney, Agent, or Firm*—Armstrong, Westerman, Hattori, McLeland & Naughton

[57] ABSTRACT

When fully closed throttle opening learning device M1 learns a fully closed throttle opening value THMIN on the basis of an actual throttle opening value TH at an idle running time, comparison device M2 compares the sum of the fully closed throttle opening value THMIN and a predetermined value a with the actual throttle opening value TH to decide the possibility of the occurrence of a fault, and fault decision acceptance device M3 decides the acceptance/rejection of execution of the fault decision of an idle revolution controlling unit IC on the basis of the comparison result of the comparison device M2. As a result, even with a degradation in the output characteristics of a throttle opening sensor, an erroneous decision can be avoided by rejecting the execution of the fault decision when there is a possibility of an erroneous decision.

13 Claims, 10 Drawing Sheets

FAULT DECIDING SYSTEM FOR IDLE REVOLUTION CONTROLLING UNIT

BACKGROUND OF THE INVENTION

1. Field of the Invention

The present invention relates to a fault deciding system for detecting a fault of an idle revolution controlling unit of an engine.

2. Related Art

An idle RPM (revolution-per-minute) of the engine is controlled by adjusting the degree of opening of an EACV (Electronic Air Control Valve) bypassing a throttle valve when the throttle valve is fully closed, to control the air flow to be fed to the engine. In this case, the idle RPM controlling unit is determined to be normal when the actual idle RPM Ne detected by the RPM controlling unit integrated circuit (IC) falls within the following normal region:

$$\text{Target RPM}-100 \text{ rpm} \leq Ne \leq \text{Target RPM}+200 \text{ rpm}.$$

The idle RPM controlling unit IC is determined to be faulty when the actual idle RPM is not within the previously specified range.

The actual idle RPM Ne is detected as the engine RPM for the fully closed throttle opening value, which in turn is detected in terms of the output voltage value of a throttle opening sensor. The throttle opening value is decided to be fully closed when the output value TH of the throttle opening sensor falls within the region which is defined by a preset fully closed value $TH_0$ and a fixed value $\alpha$, as follows:

$$TH_0 \leq TH \leq TH_0 + \alpha.$$

If, however, the fully closed throttle opening value is decided on the basis of the aforementioned preset fully closed value $TH_0$, fault detection is impossible when the output value TH at the fully closed time of the throttle valve is raised to be greater than $TH_0 + \alpha$ due to the aging of the throttle opening sensor.

SUMMARY OF THE INVENTION

The present invention has been conceived in view of the background described above and has an object to properly detect the fault of the idle revolution controlling unit.

In order to achieve this object, according to the present invention, there is provided a fault deciding system for deciding a fault of an idle revolution controlling unit, which includes a control valve in a passage bypassing the throttle valve of an engine so that an idle revolution may be controlled to a target revolution by controlling the rate of air flow through the passage at an idle running time of the engine with the control valve, by comparing the deviation between the idle revolution and the target revolution with a reference value so that it may decide the fault when the deviation exceeds the reference value. The fault deciding system comprises: fully closed throttle opening value learning means for learning the fully closed throttle opening value on the basis of the actual throttle opening value at the idle running time; comparison means for comparing the sum of the fully closed throttle opening value, as learned by the fully closed throttle opening value learning means, and a predetermined value with the actual throttle opening value; and fault decision accepting means for deciding the acceptance/rejection of the fault decision of the idle revolution controlling unit on the basis of the comparison result of the comparison means.

According to this construction, even with a degradation in the output characteristics of the throttle opening sensor, whether or not the execution of the fault decision is to be accepted can be properly decided to make accurate fault decision possible.

BRIEF DESCRIPTION OF THE DRAWINGS

The foregoing and other objects, features and advantages of the present invention will become apparent from the following description of a preferred embodiment to be made with reference to the accompanying drawings, of which.

DESCRIPTION OF THE PREFERRED EMBODIMENT

Figure 1:
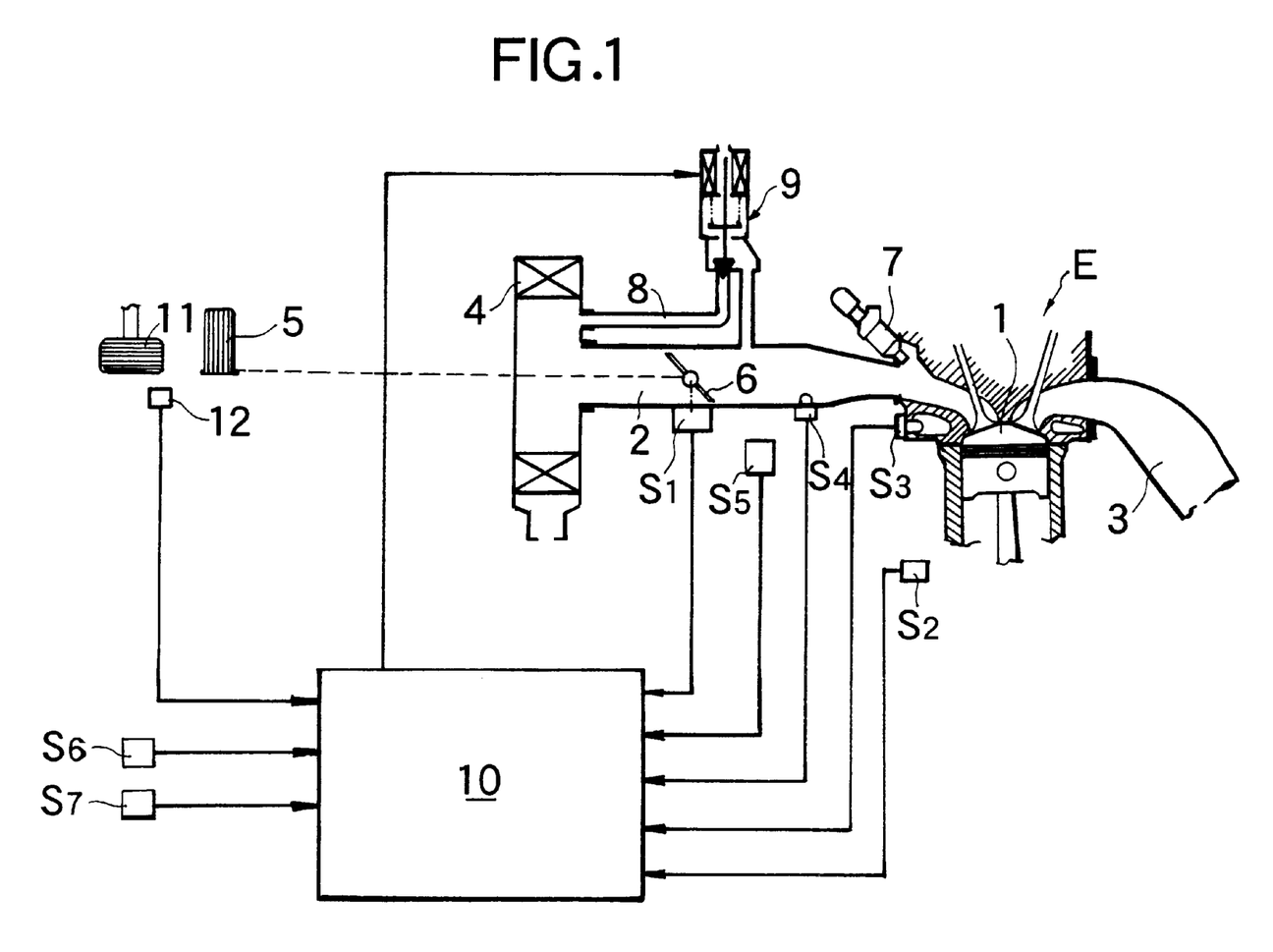
FIG. 1 is a diagram of an idle RPM controlling system according to an embodiment of the present invention.

As shown in FIG. 1, an engine E to be mounted on a vehicle with an automatic transmission is provided with an intake passage 2 leading to a combustion chamber 1 and an exhaust passage 3 exiting therefrom. The intake passage 2 is equipped downstream of an air cleaner 4 with a throttle valve 6, which is mechanically connected to and opened/closed by an accelerator pedal 5, and a fuel injection valve 7. A bypass passage 8, bypassing the throttle valve 6, is equipped with an EACV (Electronic Air Control Valve) 9 comprised of a linear solenoid valve for adjusting an auxiliary air flow, bypassing the throttle valve 6 through the bypass passage 8, at an idle running time of the engine E when the throttle valve 6 is fully closed to control the idle revolution, such as RPM (revolution-per-minute) of the engine E.

With an electronic control unit 10 comprised of a microcomputer, there are connected: a throttle opening sensor $S_1$ for detecting the degree of opening of the throttle valve 6; an engine RPM sensor $S_2$ for detecting the engine RPM; a cooling water temperature sensor $S_3$ for detecting the cooling water temperature; an intake air temperature sensor $S_4$ for detecting the intake air temperature; an atmospheric pressure sensor $S_5$ for detecting the atmospheric pressure; a vehicle speed sensor $S_6$ for detecting the vehicle speed; a shift position sensor $S_7$ for detecting the shift position of the automatic transmission; and a brake switch 12 mounted on a brake pedal 11. On the basis of the signals coming from those individual sensors $S_1$ to $S_7$ and the switch 12, the electronic control unit 10 controls the opening of the EACV 9 in a feedback manner and monitors the fault of an idle RPM controlling unit integrated circuit (IC).

Figure 10:
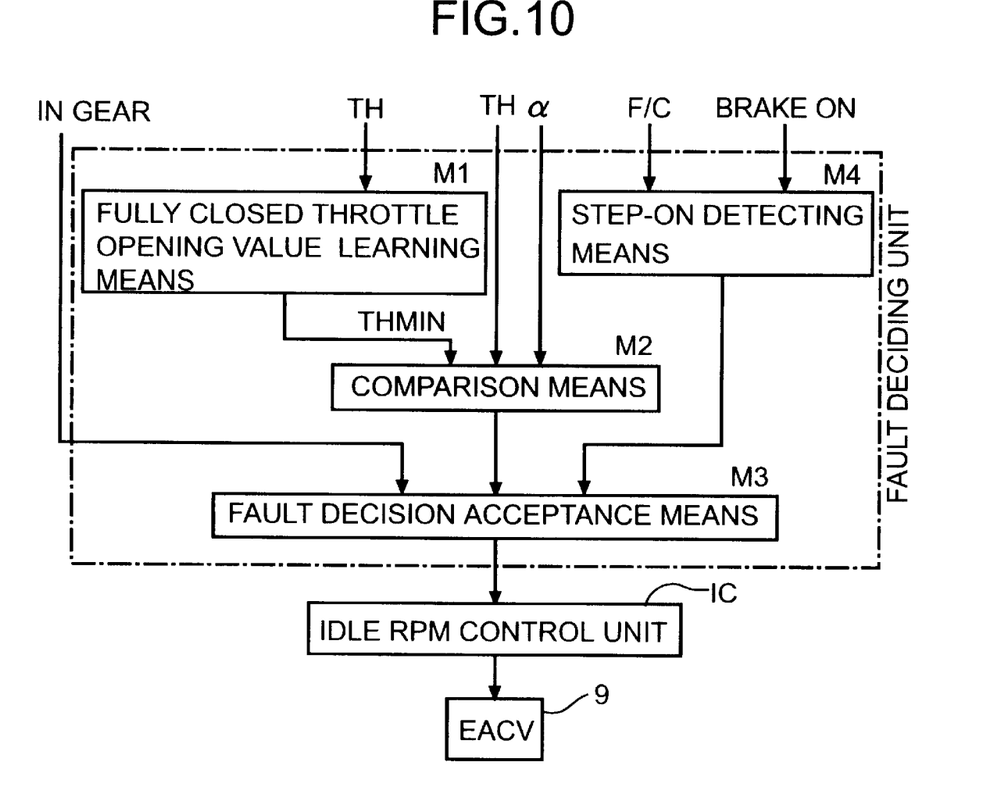
FIG. 10 is a block diagram of a control system according to the embodiment of the present invention.

As shown in FIG. 10, a fault deciding unit (included in the electronic control unit 10) for monitoring the fault of the idle RPM controlling unit IC is equipped with: fully closed throttle opening value learning means M1 for learning the fully closed throttle opening value (i.e., the fully closed throttle opening lower limit updated value, THMIN, of the throttle valve 6); comparison means M2 for comparing the sum of the fully closed throttle opening value THMIN and a predetermined value a with a throttle opening value TH; and fault decision acceptance means M3 for deciding the acceptance/rejection of the fault decision on the basis of either the comparison result of the comparison means M2, an in-gear signal, or a signal coming from step-on detecting means M4 for detecting the step-on of the accelerator pedal 5 using a fuel-cut F/C signal and a brake ON signal.

The functions of the embodiment of the present invention will be described with reference to the flow charts of FIGS. 2 to 9.

Figure 2:
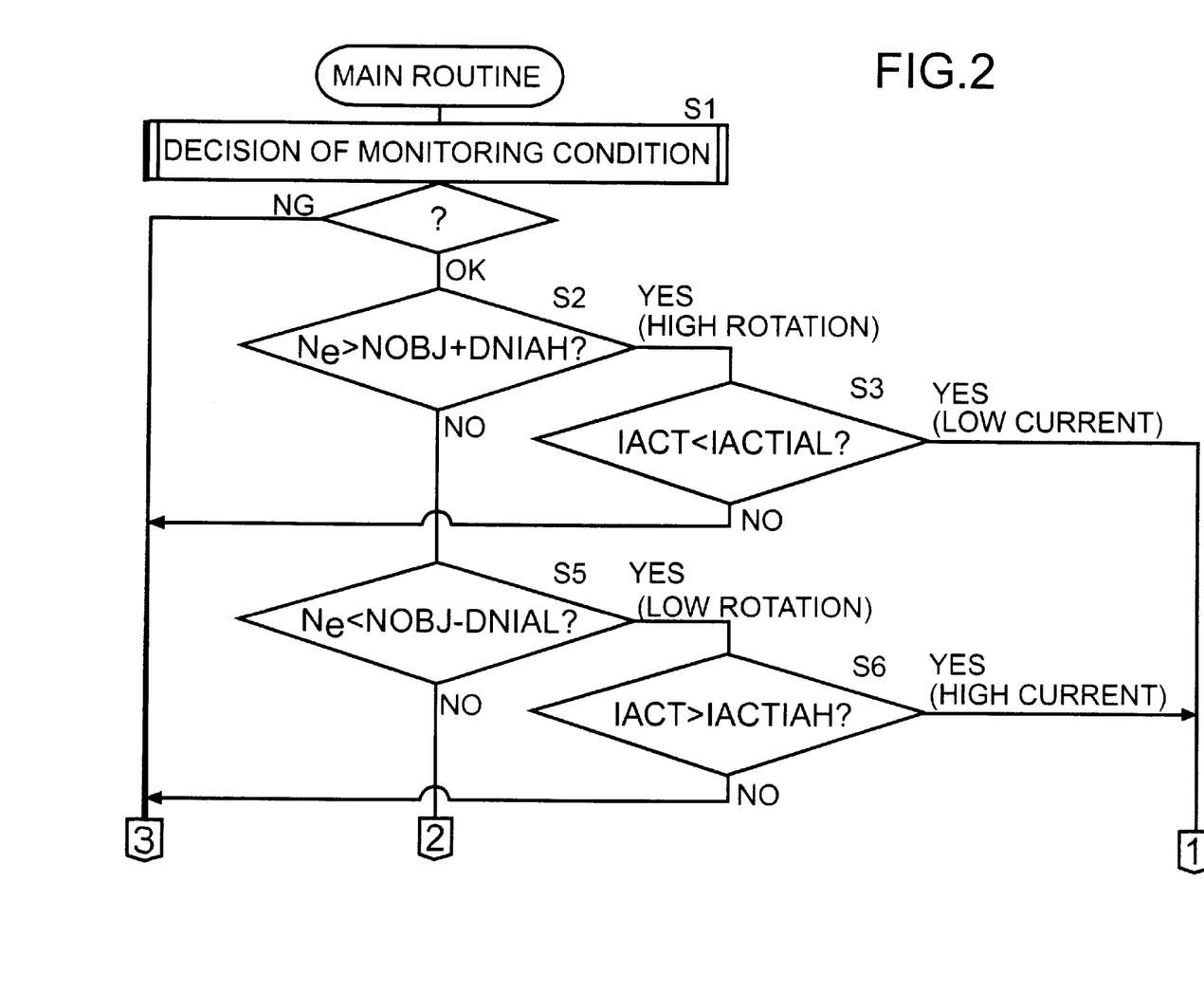
FIG. 2 is a first diagram of a flow chart of a main routine.
Figure 3:
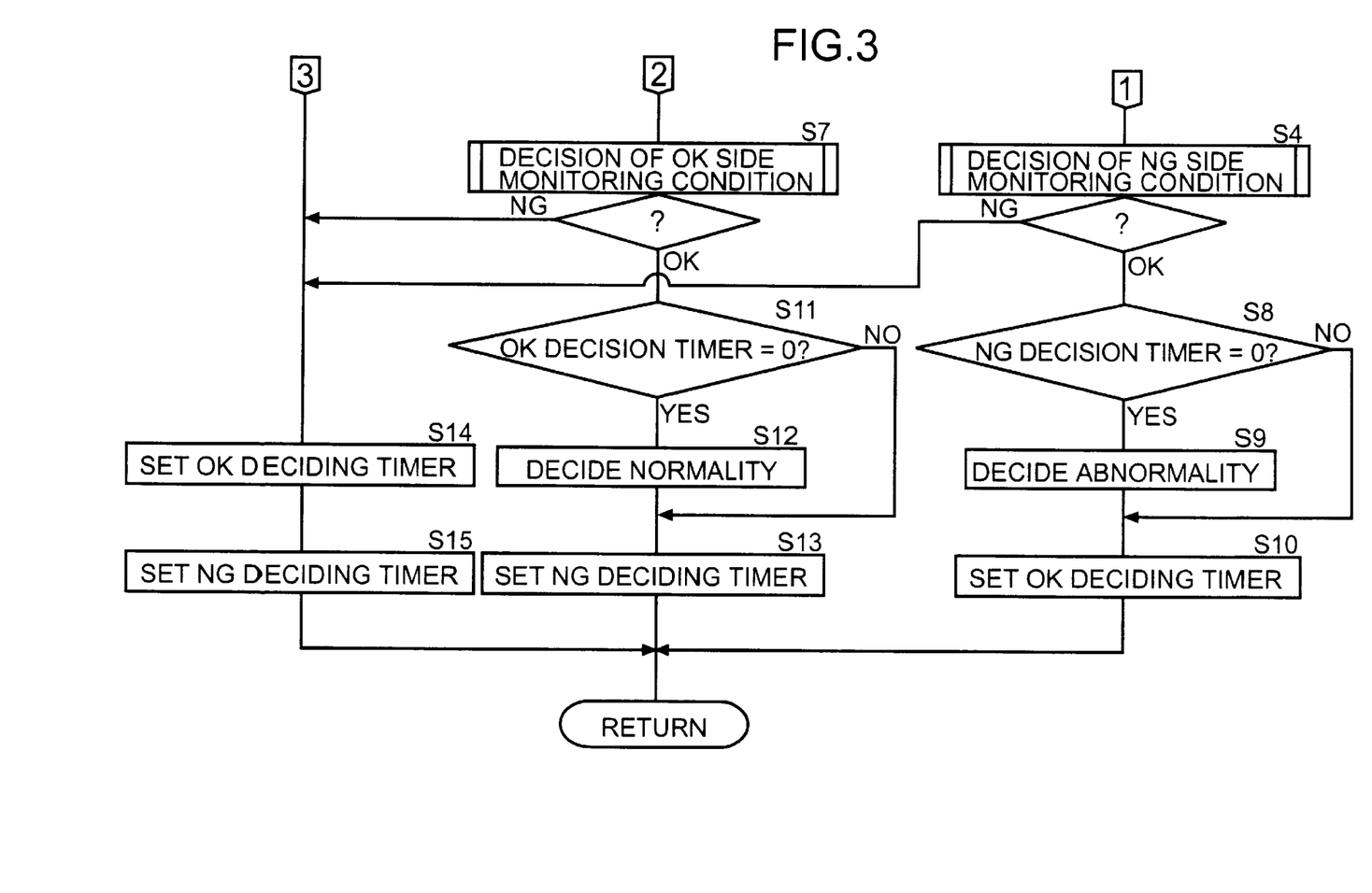
FIG. 3 is a second diagram of the flow chart of the main routine.
Figure 4:
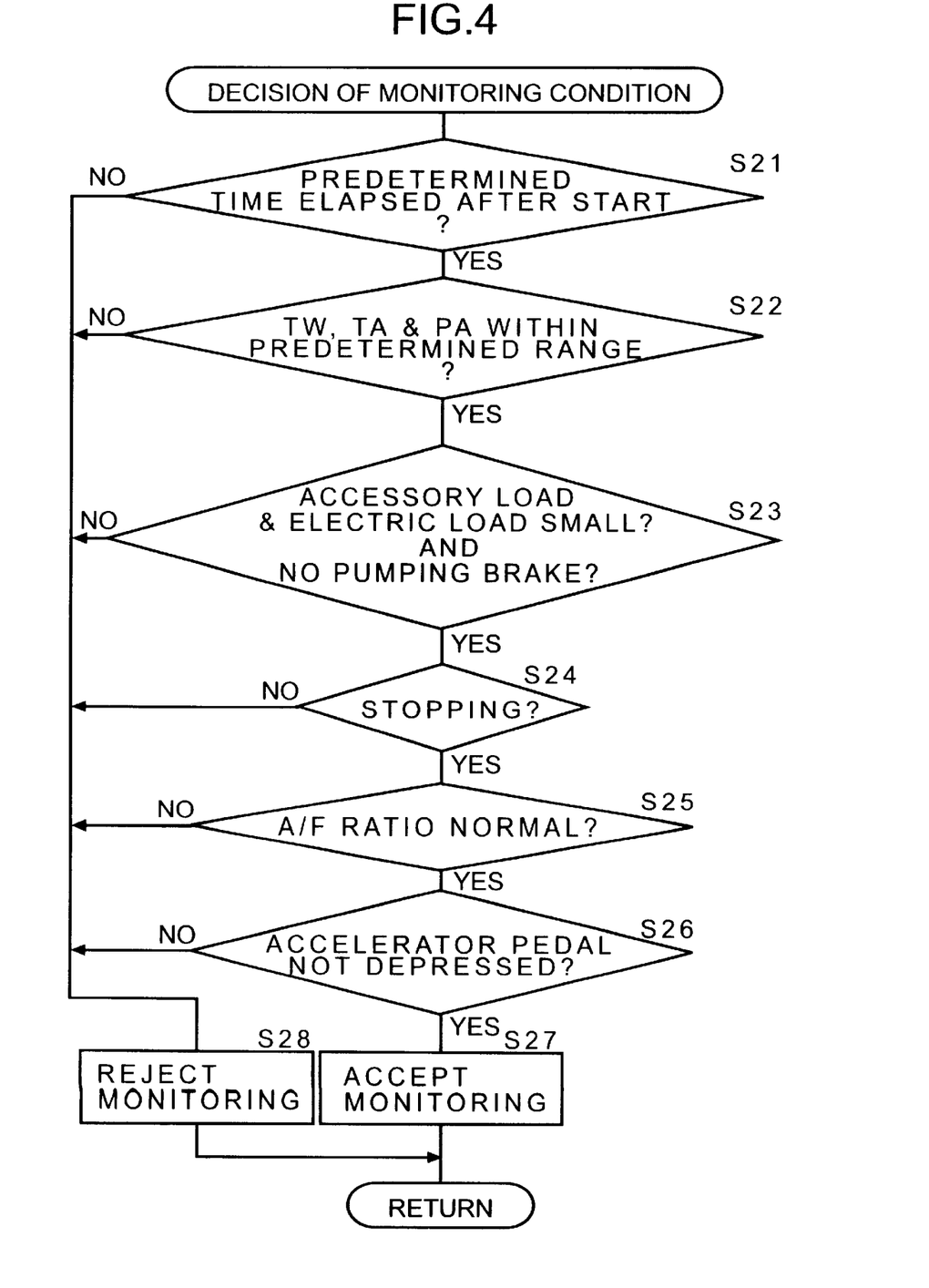
FIG. 4 is a flow chart of a monitoring condition deciding routine.

At Step S1 of the flow chart of the main routine used by the electronic control unit, as shown in FIGS. 2 and 3, it is decided whether or not the running state of the engine E is proper for monitoring the fault of the idle RPM controlling unit IC. In the flow chart of the monitor deciding routine of FIG. 4, more specifically: when it is decided at Step S21 that a predetermined time period (e.g., 120 secs.) has elapsed after the start of the engine E; when it is decided at Step S22 that the cooling water temperature TW of the engine E, as detected by the cooling water temperature sensor $S_3$, is within a predetermined range (e.g., from 80° C. to 100° C.), that the intake air temperature TA, as detected by the intake air temperature sensor $S_4$, is within a predetermined range (e.g., from 0° C. to 80° C.), and that the atmospheric pressure PA, as detected by the atmospheric pressure sensor $S_5$, is within a predetermined range (e.g., no less 580 mmHg); when it is decided at Step S23 that the accessory load and the electric load are not more than a predetermined value (e.g., 19 A) and that no pumping brake is done; when it is decided at Step S24 that the vehicle speed detected by the vehicle speed sensor $S_6$ is zero so that the vehicle is stopped; when it is decided at Step S25 that the air/fuel A/F ratio is normal; and when it is decided at Step S26 that the accelerator pedal 5 is not depressed, as will be described hereinafter, then it is decided that the running state of the engine E is proper for monitoring the fault of the idle RPM controlling unit IC, and the monitoring is accepted at Step S27. When any of the conditions of Steps S21 to S26 is not satisfied (i.e., NO), it is decided that the running state of the engine E is improper for monitoring the fault of the idle RPM controlling unit IC, so that the monitoring is rejected at Step S28.

Returning to the flow chart of FIGS. 2 and 3, when the monitoring is accepted at Step S1, the idle engine RPM Ne, as detected by the engine RPM sensor $S_2$, and the upper limit reference NOBJ+DNIAH are compared at Step S2. Here, the value NOBJ is a target idle RPM, and the value DNIAH is a predetermined fixed value (e.g., 200 rpm). When it is decided at Step S2 that the idle engine RPM Ne exceeds the upper limit reference NOBJ+DNIAH and when it is decided at Step S3 that the current value IACT of the EACV 9 is less than a reference value IACTIAL (e.g., 478 mA) so that the auxiliary air flow is low, it is estimated that a fault occurs in the idle RPM controlling unit IC, and the routine advances to Step S4, at which the later-described NG (abnormal) side monitoring condition is decided.

When it is decided at Step S2 that the idle engine RPM Ne is not more than the upper limit reference NOBJ+DNIAH, on the other hand, the routine advances to Step S5, at which the idle engine RPM Ne is compared with a lower limit reference NOBJ−DNIAL. Here, the value DNIAL is a predetermined fixed value (e.g., 100 rpm). When it is decided at Step S5 that the idle engine RPM Ne is less than the lower limit reference NOBJ−DNIAL, it is decided at Step S6 whether or not the current value IACT of the EACV 9 is more than a reference value IACTIAH (e.g., 506 mA). When this answer is YES so that the auxiliary air flow is high, it is estimated that the fault occurs in the idle RPM controlling unit IC, and the routine advances to Step S4, at which the later-described NG side monitoring condition is decided.

When it is decided at Steps S2 and S5 that the idle engine RPM Ne is within the range of NOBJ−DNIAL≦Ne≦NOBJ+DNIAH, the routine advances to Step S7, at which the later-described OK (normal) side monitoring condition is decided.

When the NG side monitoring is accepted at Step S4, the routine advances to Step S8. When the NG deciding timer, as set at Step S13 or S15, is timed out at Step S8, that is, when the NG side monitoring acceptance is continued for a predetermined time period (e.g., 20 secs.), it is decided at Step S9 that the idle RPM controlling unit IC is faulty. When it is decided at Step S7 that the OK side monitoring is accepted, on the other hand, the routine advances to Step S11. When the OK deciding timer, as set at Step S10 or Step 14, is timed out at Step S11, that is, when the OK side monitoring acceptance continues for a predetermined time period (e.g., 5 secs.), it is decided at Step S12 that the idle RPM controlling unit IC is normal.

Figure 5:
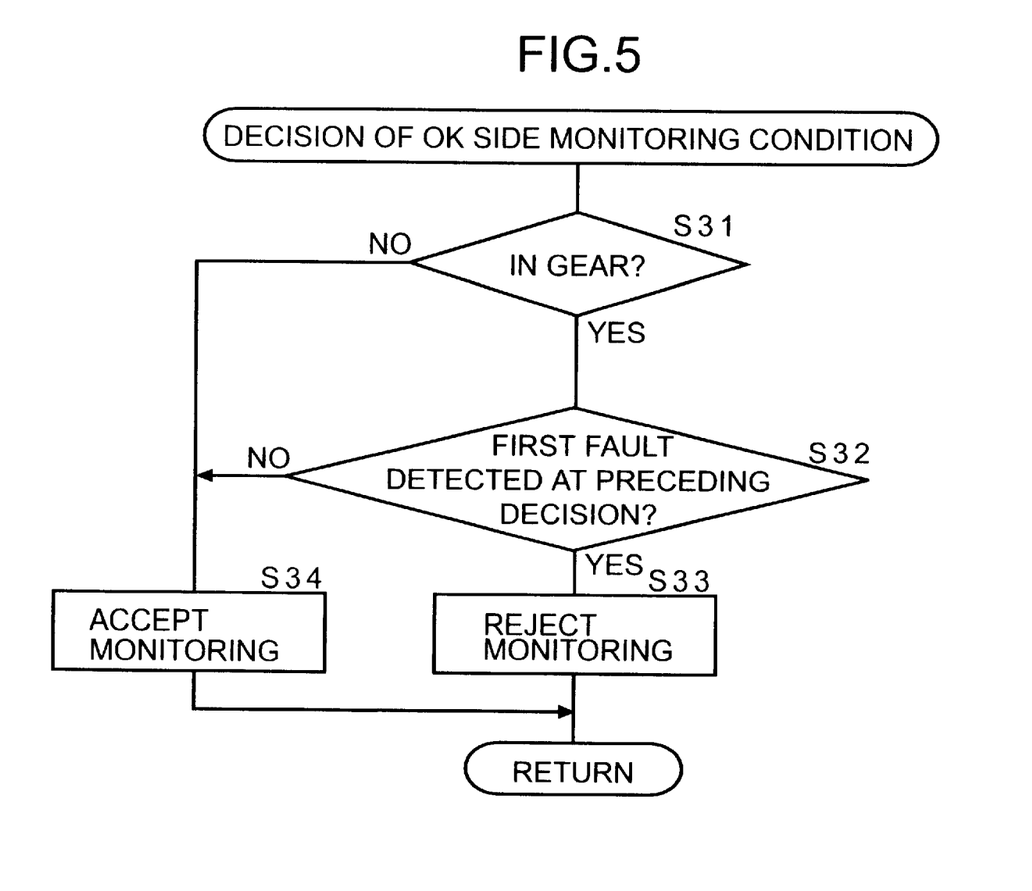
FIG. 5 is a flow chart of an OK side monitoring condition deciding routine.

With reference to the flow chart of FIG. 5, here will be described the subroutine of the "Decision of OK Side Monitoring Condition" of Step S7 of the main routine.

At first, when it is decided at Step S31 by the shift position sensor $S_7$ that the automatic transmission is in the in-gear state (i.e., in the non-neural position) and when it is decided at Step S32 that the fault of the idle RPM controlling unit IC is detected at the preceding decision, the OK side monitoring is rejected at Step S33. On the other hand, when it is decided at Step S31 that the automatic transmission is in the neutral position, or even when the automatic transmission is in the in-gear state but it is decided at Step S32 that the fault of the idle RPM controlling unit IC is not detected at the preceding decision, the OK side monitoring is accepted at Step S34.

Here, the load on the automatic transmission is different between the neutral time and the in-gear time so that the idle RPM will accordingly fluctuate. Even when it is decided at first fault decision (the previous calculating loop of the main routine) that the idle RPM Ne exceeds the normal region at the neutral time, the NG results (the answer at Step S2 is YES); but when the subsequent second fault decision (the present calculating loop of the main routine) reveals that the automatic transmission is in the in-gear state, the idle RPM Ne is brought into the aforementioned normal region by the increase in the load so that the OK results (the answer at Step S2 is NO). As described in connection with Step S8 and Step S9, the fault decision is not made unless all the fault decisions (all the calculating loops) carried out for 20 seconds reveal the NG, in other words, the fault decision is not made unless the first and second fault decisions reveal the NG continuously. When the OK is decided at the second fault decision by the increase in the load due to the in-gear, as described above, the fault, which should be intrinsically decided so, will be erroneously decided to be normal.

In the present embodiment, however, the in-gear state is found at the second decision subsequent to the first one found to be NG, the OK side monitoring is rejected so that the erroneous decision of the OK is avoided in advance.

Figure 6:
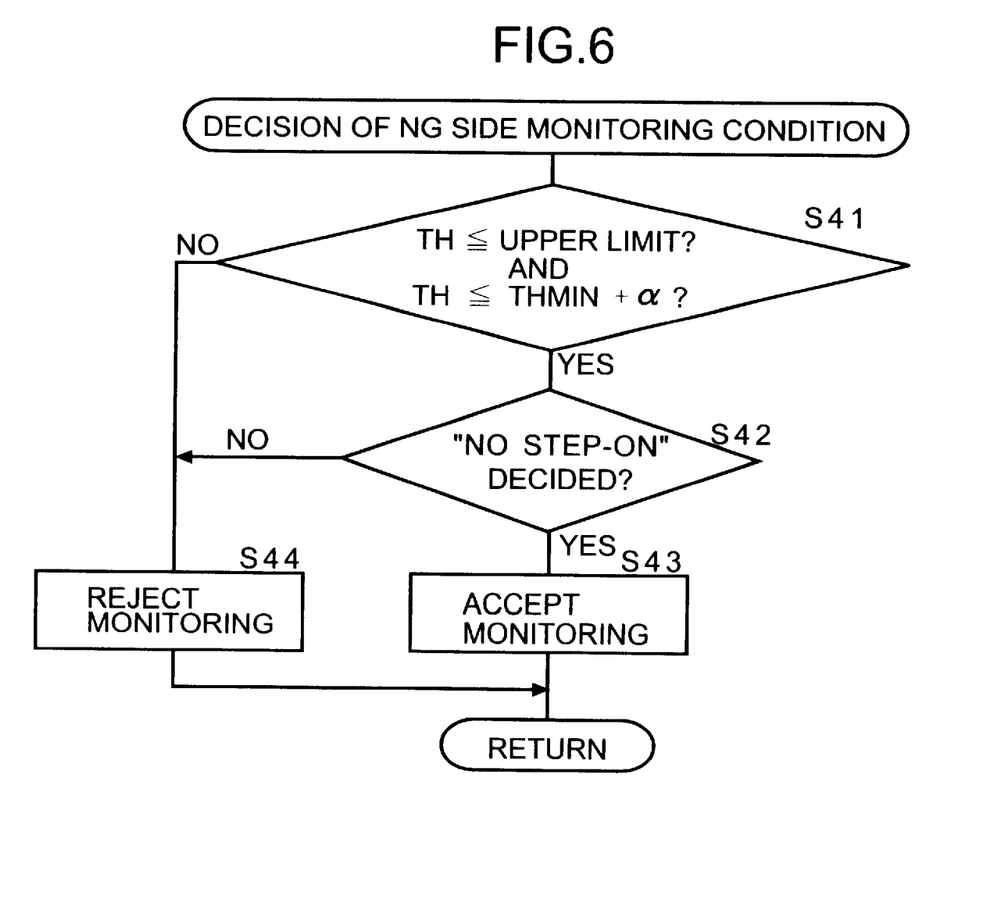
FIG. 6 is a flow chart of an NG side monitoring condition deciding routine.

With reference to the flow chart of FIG. 6, here will be described the subroutine of the "Decision of NG Side Monitoring Condition" of Step S4 of the foregoing main routine.

First of all, when it is confirmed at Step S41 that the throttle opening value TH, as detected by the throttle opening sensor $S_1$, at the idle time is not more than the predetermined upper limit (e.g., 2.0 deg.) and that the throttle opening value TH is not more than the sum of the throttle opening lower limit updating value THMIN and a fixed value $\alpha$ (e.g., 0.3 deg.) so that the throttle valve 6 is in the fully closed state, and when it is confirmed at subsequent Step S42 that the driver did not depress the accelerator pedal 5 (i.e., "No Step-on"), the NG side monitor is accepted at Step S43. When the throttle valve 6 is not in the fully closed state at Step S41 or when the "Step-on" is confirmed at Step S42, the NG side monitoring is rejected at Step S44. The determination of the throttle opening lower updating value THMIN and the decision of "No Step-on" will be described with reference to FIGS. 7 and 8, respectively.

When it is to be detected on the basis of the output value of the throttle opening sensor $S_1$ that the throttle valve 6 is in the fully closed position, it is decided in the prior art whether or not the throttle opening value TH detected by the throttle opening sensor $S_1$ falls within the region which is defined by a preset fully closed value $TH_0$ and the fixed value $\alpha$. That is, for $TH_0 \leq TH \leq TH_0 + \alpha$, the monitoring is accepted while estimating that the throttle valve 6 is in the fully closed position. Because of the degradation of the output characteristics of the throttle opening sensor $S_1$, however, the erroneous detection of the fully closed position of the throttle valve 6 is caused by applying the constant fully closed value $TH_0$.

In the case of the throttle opening sensor $S_1$ having a rather large output value, for example, the detected throttle opening value TH may exceed (although the throttle valve 6 is in the fully closed position) the sum of $TH_0 + \alpha$ to make monitoring impossible. In the case of the throttle opening sensor $S_1$ having a rather small output value, on the other hand, the detected throttle opening value TH falls within the region of $TH_0 \leq TH \leq TH_0 + \alpha$, although the driver depresses the accelerator pedal 5 so that the throttle valve 6 is opened from the fully closed position. In this case, the erroneous monitoring may be executed.

According to the present embodiment, however, no fixed value is used as the fully closed value $TH_0$ to detect that the throttle valve 6 is in the fully closed position. Instead, the present invention uses the throttle opening lower limit updating value THMIN which is learned from the throttle opening value TH detected by the throttle opening sensor $S_1$. As a result, the degradation of the output characteristics of the individual throttle opening sensors $S_1$ can be compensated to detect the fully closed position of the throttle valve 6 precisely. Moreover, the monitoring is not allowed without the decision of the "No Step-on" so that the misjudgment due to the depression of the accelerator pedal 5 can be avoided in advance.

Figure 7:
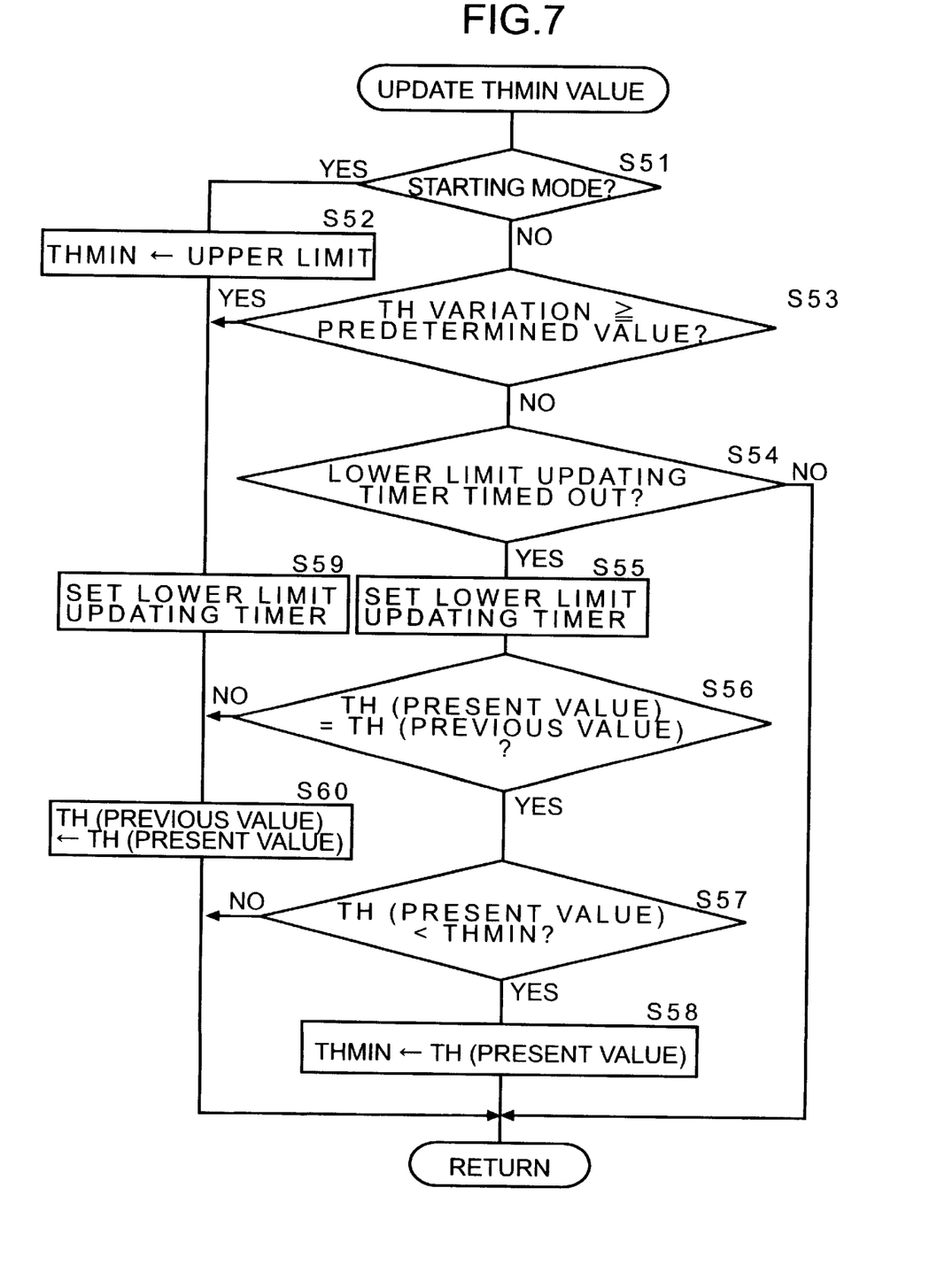
FIG. 7 is a flow chart of a throttle opening MIN value updating routine.

With reference to the flow chart of FIG. 7, here will be described the throttle opening lower limit updating routine.

First of all, when it is decided at Step S51 that the engine E is in the starting mode, the throttle opening lower limit updating value THMIN is set at Step S52 to an initial value, and the lower limit updating timer is set at Step S59. The initial value is exemplified by the upper limit of Step S41 (e.g., 2.0 degree) of the flow chart of FIG. 6.

When it is decided at Step S51 that the engine E is not in the staring mode, when it is decided at Step S53 that the fluctuation of the throttle opening value TH is less than a predetermined value (e.g., ±0.3 deg.) so that no overshoot occurs when the throttle valve 6 is abruptly closed from the fully open position to the fully closed position, and when it is decided at Step S54 that the lower limit updating timer is timed out so that a constant updating time period (e.g., 0.5 secs.) has elapsed, the lower limit updating timer is set at Step S55, and the previous value and the present value of the throttle opening value TH are compared at Step S56. When it is decided at Step S56 that the previous value and the present value are equal so that the throttle opening value TH is stable, the present value of the throttle opening value TH is compared at Step S57 with the throttle opening lower limit updating value THMIN. When the present value is lower than the throttle opening lower limit updating value THMIN, the present value is adopted at Step S58 as a new throttle opening lower limit updating value THMIN. When it is decided at Step S56 that the fully open value and the present value are not equal, this present value is adopted at Step S60 as a new previous value.

Thus, the throttle opening lower limit updating value THMIN is sequentially updated on the basis of the throttle opening value TH detected by the throttle opening sensor $S_1$, and the fully closed position of the throttle valve 6 is detected by using the throttle opening lower limit updating value THMIN, so that the degradation of the output characteristics of the individual throttle opening sensors $S_1$ can be compensated.

With reference to the flow chart of FIG. 8, here will be described the "No Step-on" deciding routine.

First of all: when it is decided at Step S61 that the engine E is being decelerated while being fuel-cut F/C; when it is decided at Step S62 that the brake switch 12 is normal; when it is decided at Step S63 that the brake switch 12 is ON; and when it is decided at Step S64 that a predetermined time (e.g., 2 secs.) has elapsed in that state, the "No Step-on" is decided at Step S65. In short, when the deceleration and fuel cut are done continuously for the predetermined time period and when the brake switch 12 is ON continuously for the predetermined time period, it is decided that the foot of the driver is placed on the brake pedal 11 but not on the accelerator pedal 5. When it is decided at Step S62 that the brake switch 12 is not normal, the "No Step-on" is decided when the deceleration fuel cut is done continuously for the predetermined time period.

Figure 8:
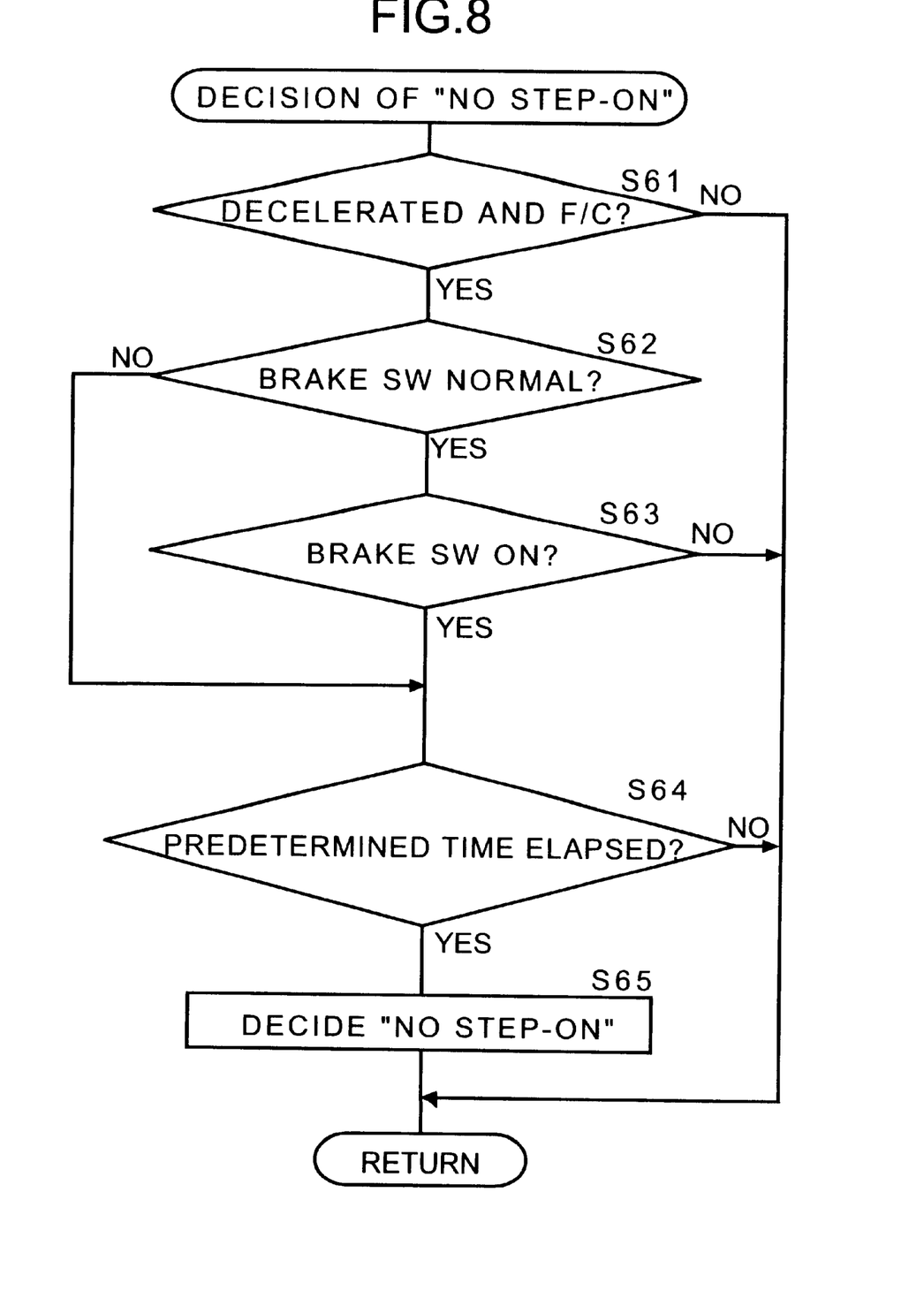
FIG. 8 is a flow chart of a "no step-on" deciding routine.
Figure 9:
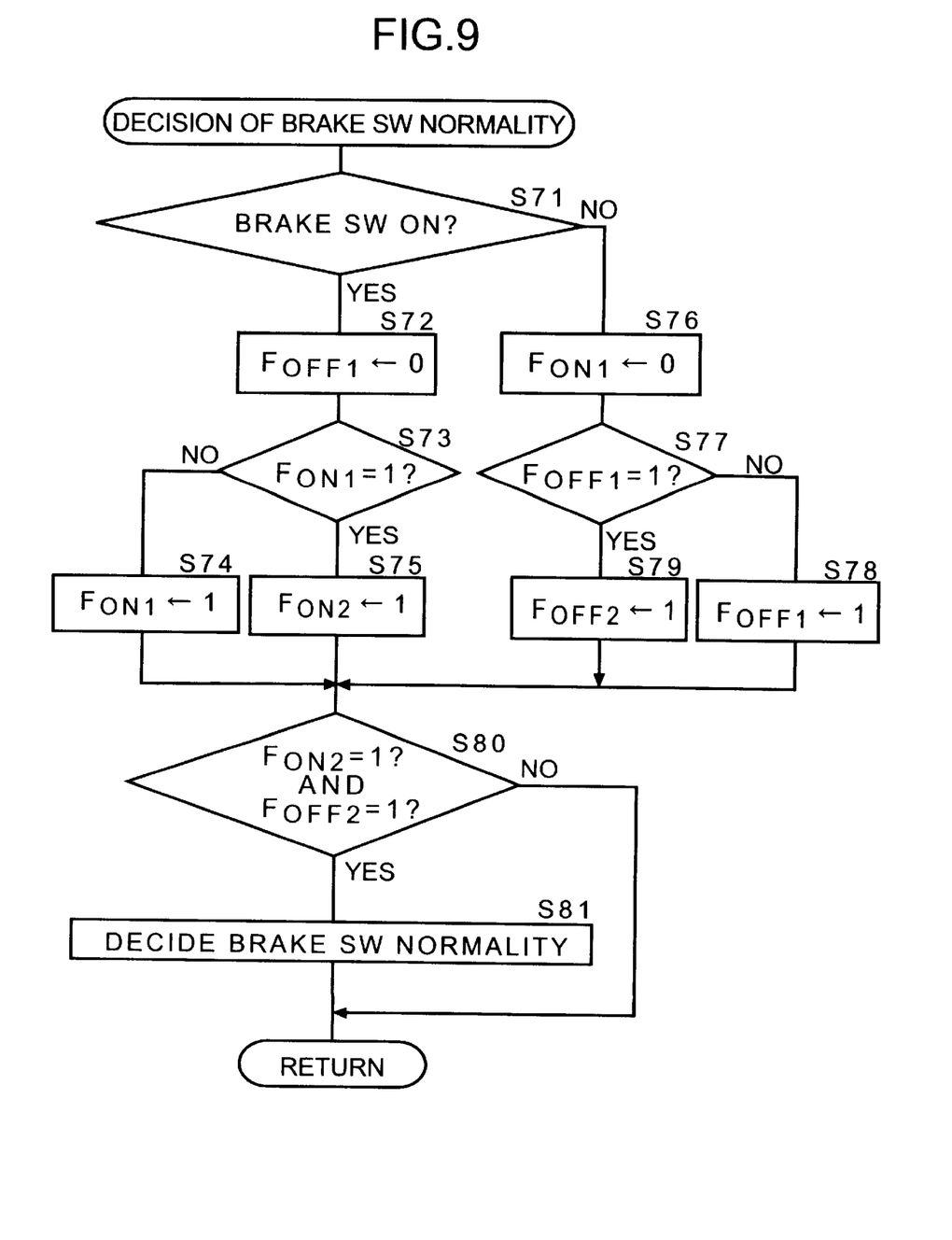
FIG. 9 is a flow chart of a brake switch normality deciding routine.

The subroutine of Step S62 of the flow chart of FIG. 8 is shown in the flow chart of FIG. 9, in which the decision of the brake switch normality will be done, as follows.

First of all, when it is decided at Step S71 that the brake switch 12 is ON, a flag $F_{OFF1}$ is reset at Step S72 to "0". When it is decided at Step S73 that a flag $F_{ON1}$ is not set at "1", the flag $F_{ON1}$ is set at Step S74 to "1". When it is decided at Step S72 that the flag $F_{ON1}$ has already been set at "1", a flag $F_{ON2}$ is set at Step S75 to "1". When it is decided at Step S71 that the brake switch 12 is OFF, on the other hand, the flag $F_{ON1}$ is reset at Step S76 to "0". When it is decided at Step S77 that the flag $F_{OFF1}$ is not set at "1", the flag $F_{OFF1}$ is set at Step S78 to "1". When it is decided at Step S77 that the flag $F_{OFF1}$ has been set at "1", on the other hand, a flag $F_{OFF2}$ is set at Step S79 to "1".

When it is decided at Step S80 that both the flags $F_{ON2}$ and $F_{OFF2}$ are set at "1", that is, when there is left the history that the brake switch 12 was continuously turned ON in two loops and OFF in two loops, it is possible to estimate that the brake switch 12 has experienced neither the ON stick fault nor the OFF stick fault. It is, therefore, decided at Step S81 that the brake switch 12 is normal.

Although a preferred embodiment of the present invention has been described in detail, it would be appreciated by those skilled in the art that the present invention can be modified in various designs without departing from the principles and spirit of the invention, the scope of which is defined in the claims and their equivalents.

What is claimed is:

1. An electronic control unit for an engine of a vehicle, comprising:

an idle revolution controlling unit controlling a rate of air flow through a bypass passage when a throttle valve is in a closed position to achieve an idle RPM for the engine; and a fault deciding unit determining the throttle valve to be in the closed position when a sensed throttle opening value of the throttle valve is within a range inclusively between a variable throttle opening lower limit and the variable throttle opening lower limit plus a predetermined value, and deciding said idle revolution controlling unit to be faulty when the idle revolution, measured when the throttle valve is in the closed position defined above, is outside a predetermined range.

2. An electronic control unit as recited in claim 1, wherein said fault deciding unit updates the variable throttle opening lower limit to be a present sensed throttle opening value when the sensed throttle opening value remains stable after a predetermined period of time and is less than the variable throttle opening lower limit.

3. An electronic control unit as recited in claim 1, wherein said fault deciding unit decides said idle revolution controlling unit to be faulty when the idle revolution is outside the predetermined range and when the vehicle is not being accelerated.

4. An electronic control unit for an engine of a vehicle, comprising:

an idle revolution controlling unit controlling a rate of air flow through a bypass passage to achieve an idle revolution for the engine;

means for determining said idle revolution controlling unit to be faulty when the idle revolution is outside a predetermined range; and a fault deciding unit accepting the faulty determination by said means for determining when a sensed throttle opening value of the throttle valve is within a range inclusively between a variable throttle opening lower limit and the variable throttle opening lower limit plus a predetermined value.

5. An electronic control unit as recited in claim 4, wherein said fault deciding unit updates the variable throttle opening lower limit to be a present sensed throttle opening value when the sensed throttle opening value remains stable after a predetermined period of time and is less than the variable throttle opening lower limit.

6. An electronic control unit as recited in claim 4, wherein said means for determining determines said idle revolution controlling unit to be faulty when the idle revolution is outside the predetermined range and when the vehicle is not being accelerated.

7. A method to control an engine of a vehicle, comprising:

controlling a rate of air flow through a bypass passage when a throttle valve is in a closed position to achieve an idle revolution for the engine;

sensing a sensed throttle opening value of the throttle valve;

determining the throttle valve to be in the closed position when the sensed throttle opening value of the throttle valve is within a range inclusively between a variable throttle opening lower limit and the variable throttle opening lower limit plus a predetermined value;

measuring the idle revolution when the throttle valve is in the closed position defined above; and deciding said step of controlling to be faulty when the idle revolution is outside a predetermined range.

8. A method as recited in claim 7, wherein said step of sensing senses a present sensed throttle opening value and a previous sensed throttle opening value; and further comprising updating the variable throttle opening lower limit to be the present sensed throttle opening value when the present sensed throttle opening value is equal to the previous sensed throttle opening value after a predetermined period of time and is less than the variable throttle opening lower limit.

9. A method as recited in claim 7, wherein said step of deciding decides said step of controlling to be faulty when the idle revolution is outside the predetermined range and when the vehicle is not being accelerated.

10. A method to control an engine of a vehicle, comprising:

controlling a rate of air flow through a bypass passage to achieve an idle revolution for the engine;

deciding said step of controlling to be faulty when the idle revolution is outside a predetermined range;

sensing a sensed throttle opening value of a throttle valve; and accepting the faulty decision by said step of deciding when the sensed throttle opening value of the throttle valve is within a range inclusively between a variable throttle opening lower limit and the variable throttle opening lower limit plus a predetermined value.

11. A method as recited in claim 10, wherein said step of sensing senses a present sensed throttle opening value and a previous sensed throttle opening value; and further comprising updating the variable throttle opening lower limit to be the present sensed throttle opening value when the present sensed throttle opening value is equal to the previous sensed throttle opening value after a predetermined period of time and is less than the variable throttle opening lower limit.

12. A method as recited in claim 10, wherein said step of deciding decides said step of controlling to be faulty when the idle revolution is outside the predetermined range and when the vehicle is not being accelerated.

13. A fault deciding system for deciding a fault of an idle revolution controlling unit, which includes a control valve in a passage bypassing the throttle valve of an engine so that an idle revolution may be controlled to a target revolution by controlling a rate of air flow through said passage at an idle running time of the engine with said control valve, by comparing a deviation between the idle revolution and the target revolution with a reference value so that it may decide the fault when said deviation exceeds said reference value, comprising:

fully closed throttle opening value learning means for learning a fully closed throttle opening value on the basis of an actual throttle opening value at the idle running time;

comparison means for comparing the sum of the fully closed throttle opening value, as learned by said fully closed throttle opening value learning means, and a predetermined value with the actual throttle opening value; and fault decision acceptance means for deciding an acceptance/rejection of the fault decision of said idle revolution controlling unit based on a comparison result of said comparison means.

* * * * *